United States Patent [19]
Oberpichler

[11] 3,800,627
[45] Apr. 2, 1974

[54] HYDRAULIC CONTROL DEVICE

[75] Inventor: Gerd Oberpichler, Braunschweig, Germany

[73] Assignee: Volkswagenwerk Aktiengesellschaft, Wolfsburg, Germany

[22] Filed: July 21, 1972

[21] Appl. No.: 273,720

[30] Foreign Application Priority Data
July 24, 1971  Germany............................ 2137160

[52] U.S. Cl................................................ 74/752 C
[51] Int. Cl................................................ F16h 3/74
[58] Field of Search ................................ 74/752 C

[56] References Cited
UNITED STATES PATENTS
3,650,162  3/1972  Leising et al. ...................... 74/867
3,295,387  1/1967  Leonard et al. ................... 74/869 X
3,381,547  5/1968  Forster et al. ..................... 74/751 X
3,714,836  2/1973  Pierce, Jr. et al................. 74/752 C Primary Examiner—Arthur T. McKeon
Attorney, Agent, or Firm—Brumbaugh, Graves, Donohue & Raymond

[57] ABSTRACT

An improvement in controlling the automatic shifting of a planetary gear in an automatic transmission for motor vehicles. The purpose is to make the down-shift a smoother operation by eliminating the shifting jolt caused by a downshift made when the engine is incorrrctly synchronized with the lower gear for a given vehicle speed.

8 Claims, 3 Drawing Figures

HYDRAULIC CONTROL DEVICE

BACKGROUND OF THE INVENTION

This invention relates to the control of the automatic shifting of the planetary gear when downshifting an automatic transmission for motor vehicles and, more particularly, to a novel and highly-effective improvement in the control system which results in a smooth downshift at all vehicle speeds.

The invention is applicable to automatic transmissions having a clutch controlling the higher gear and a brake band controlling the lower gear. The brake band piston, which when application of the brake band, is double-acting, i.e., it is actuated positively in both directions. The piston is acted upon on the application side (to apply the brake band) by means of a pressure-reducing device. The transmission also has a sleeve valve, which, in response to hydraulic pressure inputs determined by vehicle speed and engine load, connects a clutch line used to carry control pressure to the application side of the clutch piston and a brake-band release line used to carry control pressure to the release side of the brake-band piston, to atmospheric pressure when the transmission is downshifted.

Control devices of this type have been successfully used in the automatic transmission of the Volkswagen 1600. The control device shifts the second and third (direct) gear of the transmission by applying control pressure to the release side of the brake-band piston for the second gear and to the application side of the piston of the third-gear clutch on shifting into higher gear. When downshifting, to which the invention is directed, the process is reversed. In that case, the sleeve valve relieves the pressure on the application side of the piston of the third gear-clutch and the release side of the brake piston of the brake-band for second gear so that the second-gear brake-band, because of the pressure already exerted on the application side of the brake-band piston, can be applied and engage second gear. The application of the brake-band and the engagement of second gear is delayed in order to give the unloaded engine time to accelerate so as to be synchronized with the vehicle speed for a smooth downshift. The delay device comprises two nozzles, one larger than the other, connected in parallel in the second-gear brake-band application line, and a sleeve valve within the branch line of the larger nozzle. The piston of the sleeve valve assumes either of two end positions depending on the speed of the vehicle and as a result the hydraulic medium passes through either the small nozzle or through both nozzles so that the second gear brake is applied with a greater or a lesser delay. The control device described operates in two speed points.

These conventional devices all have the deficiency that synchronism is perfect only for the selected speed points; at all other speeds, synchronism is only approximate, and a shifting jolt is felt by the vehicle driver and passengers. This is not only a source of annoyance to some people but a cause of transmission wear and tear.

SUMMARY OF THE INVENTION

A primary object of the invention is to remedy the shortcomings of conventional automatic transmissions outlined above and, in particular, to refine the control system described above with regard to the speed-dependent transitions from a higher gear to a lower gear, i.e., to render the transitions infinitely variable (independent of selected speed points), so that downshifting at any vehicle speed without a shifting jolt is effected.

On shifting from a higher to a lower gear, the engine speed must increase in accordance with the transmission gear jump.

The absolute speed increase required of the engine is smaller for low vehicle speeds than it is for high vehicle speeds, and the time required by the engine to accelerate to synchronous speed varies in direct proportion to the vehicle speed.

When donwshifting by existing control means, the third-gear clutch is released and the second-gear brake-band is applied as described above. If the brake-band is applied too soon, the engine is accelerated by the vehicle momentum and the vehicle and its passengers experience a decelerating jolt. If the brake-band is applied too late, the engine will first revolve above synchronizing speed and upon application of the brake-band will be reduced to the proper speed by the vehicle inertia. This results in an acceleration jolt. The proper period of time between the release of the clutch and the application of the brake-band is the time needed by the motor for self-acceleration to synchronous speed. This period of time has been controlled under current practice, as indicated above, by filling the operating cylinder on the application side of the second-gear brake-band at a rate which varies only as a crude function of the vehicle speed.

In accordance with the invention, a delay in the reduction of the control pressure in the clutch line is produced by means of a pressure reservoir connected in parallel with the clutch. The reservoir maintains the control pressure in the clutch line until it has discharged, initially by way of a restricted orifice and subsequently by way of a bypass line, to atmospheric pressure. The sudden discharge through the bypass line, which occurs in infinitely variable dependence upon the speed of the vehicle, permits release of the clutch. The pressure-reducing device associated with the brake-band thus requires but a single restriction.

A primary advantage of the invention is that it facilitates a completely smooth downshift within the overlapping speed range of two adjacent gears by keeping the time of application of the lower-gear brake-band constant and releasing the higher-gear clutch prior to the time of application of the brake-band, variably as a function of vehicle speed.

Release of the pressure in the clutch line to atmospheric pressure is accomplished at the proper time by use of a control sleeve valve. The control sleeve valve includes a double-ended piston, one end of which is acted upon by the control pressure in the clutch line. In opposition to the clutch-line control pressure and acting on the opposite end of the control sleeve valve piston is the combined pressure of a spring and a hydraulic pressure proportional to vehicle speed. When the combined spring and hydraulic pressure proportional to vehicle speed is sufficient to overcome the control pressure in the clutch line, the control sleeve valve piston shifts and opens the bypass line so that the higher-gear clutch is immediately disengaged. An advantage to the use of this type of control sleeve valve is its ready availability and comparatively low cost.

In order to delay simply and economically the reduction in pressure in the clutch line after the downshift has been initiated, the pressure reservoir is best designed as a cylinder enclosing a free-floating double-acting piston that receives on one side a constant pressure at all times during operation of the vehicle, and is opposed on the other side by the control pressure in the clutch line and the pressure of a spring.

Release of the third-gear clutch upon reduction of the control pressure in the clutch line by action of the control sleeve valve, is most simply accomplished by using springs to provide the force in the release direction.

BRIEF DESCRIPTION OF THE DRAWING

An understanding of other aspects of the invention can be gained from a consideration of the following detailed description of the preferred embodiments thereof, in conjunction with the appended figures of the drawing, wherein.

DESCRIPTION OF THE PREFERRED EMBODIMENTS

Figure 1:
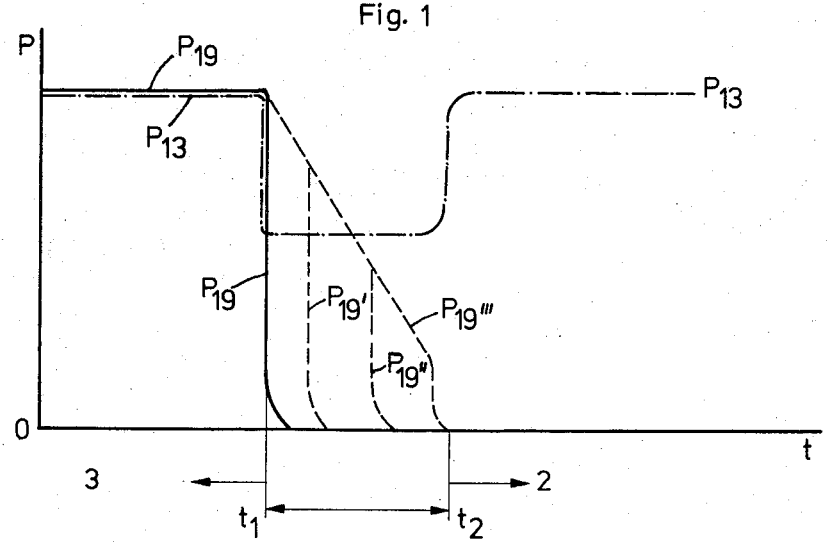
FIG. 1 is a graph of the pressures in the lines leading to the application side of the brake-band piston and the release side of the clutch piston of an automatic transmission controlled in accordance with the invention, plotted against time.
Figure 3:
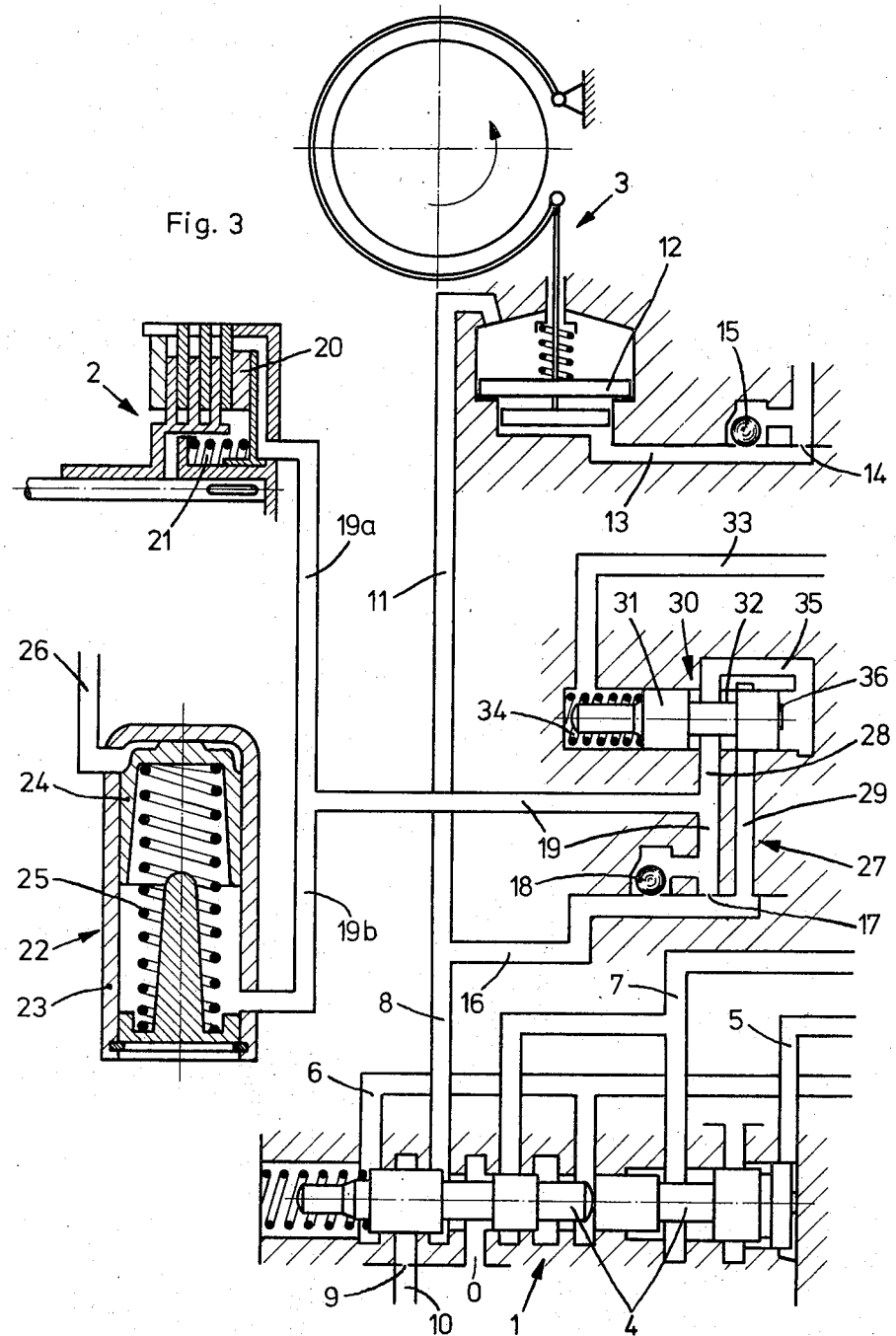
FIG. 3 is a schematic of the control device in accordance with the invention as applied to the shifting of an automatic transmission between the third and second gears.

While operating in third gear, the sleeve valve 1 is to the left as viewed in FIG. 3 and the control pressure from a source 10 keeps the third gear clutch 2 engaged and the second gear brake-band 3 released. Pressure is also applied on the application side (the lower side as represented in FIG. 3) of a double-acting, stepped brake piston 12. However, such pressure is not effective to apply the brake-band in that it acts upon the smaller surface of the stepped brake-band piston 12. The pressure in line 13 applied to the application side of the brake-band piston 12 is represented in FIG. 1 by dots and dashes and indicated as $P_{13}$ while the servo pressure in line 19 and its branches 19a and 19b applied on the application side (the right side as represented in FIG. 3) of the clutch 2 is represented in FIG. 1 by a solid line and indicated as $P_{19}$. The pressures $P_{13}$ and $P_{19}$ are of equal magnitude until the time $t_1$, i.e., until the start of the downshift to second gear. At time $t_1$, the sleeve valve 1 shifts to the right, connecting the supply line 8 to a drain 0, and a sudden removal of the pressure on the release side (the upper side as represented in FIG. 3) of the brake piston 12 occurs so that the piston can be displaced practically without resistance by the pressure $P_{13}$ exerted on the application side of the piston. The removal of the pressure on the release side of the brake piston 12 causes a sudden drop in pressure $P_{13}$ which can build up again only after a constant time delay equal to the time required for completion of the shifting process. The shifting process is completed at time $t_2$, the instant the second-gear brake-band 3 is applied.

At time $t_1$, the application side (the right side as represented in FIG. 3) of the clutch piston 20 is also cut off from the supply 10; however, the control pressure $P_{19}$ does not necessarily drop immediately to atmospheric pressure but drops as a function of the vehicle speed. If the downshifting is effected at higher vehicle speeds, $P_{19}$ immediately drops to atmospheric pressure and the clutch is released by a spring 21. The engine and the transmission are then disengaged. In this situation the entire shifting period, $t_2 - t_1$, is available for the unloaded engine to increase its speed, in accordance with the graph in FIG. 2, from $n_3$, the third-gear speed, to $n_2$, the second-gear speed. When the downshifting is required at lower vehicle speeds, a device prevents the clutch line 19 and its branch 19a from becoming pressureless immediately and in so doing prevents the clutch 2 from disengaging. The pressure in the clutch line decreases slowly but remains sufficient to engage the clutch. The point at which pressure $P_{19}$ is dropped to atmospheric pressure, so that the clutch becomes disengaged, is determined by a speed-sensing control device that causes the clutch to disengage when there is sufficient time remaining in the shifting period $t_2-t_1$ for the engine to accelerate and become synchronized with the second gear for a particular vehicle speed. This is represented by the pressure graphs $P_{19}'$, $P_{19}''$ and $P_{19}'''$ corresponding to decreasing vehicle speeds and wherein the time during which the engine is disengaged is decreased for each lower vehicle speed. This is consistent, since at the lower vehicle speeds, less time is required by the engine to reach the engine speeds appropriate to second gear. The relative magnitudes of increases in engine speed upon downshifting at progressively lower vehicle speeds are indicated in FIG. 2 by $n_2, n_2', n_2''$ and $n_2'''$.

Figure 2:
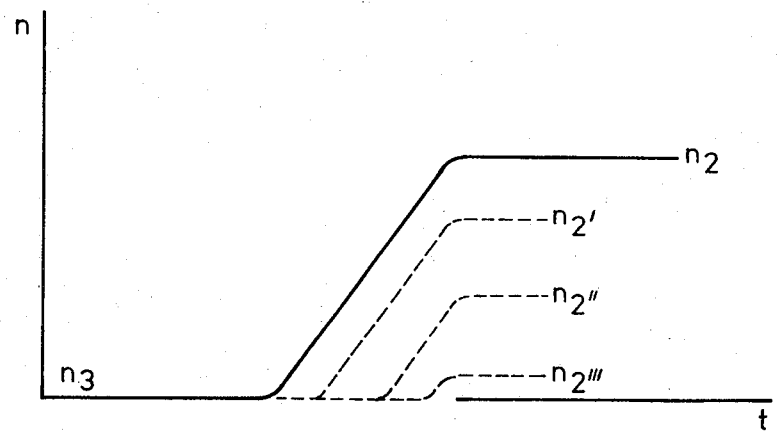
FIG. 2 is a graph of the changes in engine speed as a result of the pressure modifications in FIG. 1, plotted against time and employing the same time scale as FIG. 1.

FIG. 3 is a schematic of a shifting arrangement, the functioning of which corresponds to the graphs of FIGS. 1 and 2. FIG. 3 depicts the structure in the process of shifting. The sleeve valve 1 has already shifted because of modified operating conditions (discussed in detail below) from the left position corresponding to third gear operation to the right position corresponding to second gear operation. The third-gear clutch 2 and associated second-gear brake 3 are still shown in the position corresponding to third-gear operation, however. The piston 4 of the sleeve valve 1 receives hydraulic pressure at both ends. At one end (the right end is represented in FIG. 3) a line 5 delivers pressure as a function of the vehicle speed; at the other end (the left end as represented in FIG. 3), which is spring-loaded, pressure is supplied by a line 6 as a function of the engine load. The piston 4 is stepped between its ends and is acted upon in the stepped zone by hydraulic pressure from lines 7 for the kick-down shift. The sleeve valve 1 controls a hydraulic pressure circuit supplying the activating pressures for the individual shifting mechanisms in the transmission, by a line 8 connected selectively with a feeder line 10 provided with a restriction 9 or with atmospheric pressure at 0.

The line 8 continues into a brake-release line 11 leading to the larger, spring-loaded brake-release surface of a stepped brake piston 12 for release of the second-gear brake-band 3. The smaller, application surface of the brake piston 12 is operatively connected to a line 13 which also carries control pressure and which includes a fixed orifice restriction 14 and a check valve 15. The check valve 15 permits the hydraulic medium to flow freely back from the brake piston 12 on release of the brake-band but permits flow of the hydraulic medium to apply the brake-band only slowly through the orifice 14.

The line 8 branches off to a line 16 which is connected beyond a fixed orifice restriction 17 and a check valve 18 bridging the fixed surface orifice restriction, to the clutch line 19, which in turn branches into lines 19a and 19b. Free flow is permitted from the line 16 to the line 19 through the check valve 18, but only restricted flow is possible from the line 19 to the line 16 through the restricted orifice 17.

The line 19a leads to the clutch piston 20 of the third-gear clutch 2 which in the release direction is loaded by a spring 21. The clutch piston 20 serves to press together the clutch disks when third gear is to be engaged.

The line 19b leads to a pressure reservoir 22. The hydraulic medium is stored below the piston 24 enclosed in a cylinder 23. The piston 24 is biased from the reservoir side by a compression spring 25 and receives pressure on its head by means of the line 26.

Between the line 16 and the clutch line 19 is provided a bypass line 27 bridging the fixed orifice restriction 17 and the check valve 18. The bypass line 27 includes a control valve 30 with an inlet 28 and a discharge 29. Within the control valve 30 is provided a piston 31 having a shoulder-defining recess 32 between its ends. The piston 31 is acted upon at one end by a spring 34 and a line 33 carrying pressure proportional to vehicle speed. The recess 32 is of such a length that when the piston 31 is in the end position away from the spring 34, the inlet 28 and the discharge 29 are bridged by the recess 32. When the piston 31 is in the end position toward the spring 34, the discharge 29 of the bypass line 27 is closed and a channel 35 enables the hydraulic medium to flow from the line 28 and act on surface 36 of the piston 31.

The operation of the shifting structure is as follows:

When the transmission is in third gear, the piston 4 of the sleeve valve 1 is in the left position (the position shown in FIG. 3 is the right position). At that time the constant control pressure prevailing in the feeder line 10 keeps the third gear clutch 2 engaged by way of the line system 8, 16 and 19, and keeps the second gear brake-band 3 released by way of the line system 8 and 11. Downshifting to second gear is initiated by a displacement of the piston 4 from the left to the right position by interaction of the pressures in the lines 5 and 6 (and 7, if applicable). In this way the control line 8 is connected directly to atmospheric pressure at 0 as shown in FIG. 3. The pressure on the release side of the second-gear brake-band piston 12 drops to atmospheric pressure immediately and the brake-band piston 12 is moved upward gradually because of the control pressure applied to the application side of the brake-band piston by way of the fixed orifice restriction 14 and the line 13. The application of the second-gear brake at time $t_2$ is always completed in a predetermined time interval $t_2-t_1$ after the dumping of the fluid in the line 8 at time $t_1$. The pressure curve in line 13 is indicated by the curve $P_{13}$ in FIG. 1.

While the clutch line 19 is also connected to atmospheric pressure at 0 by way of line 16 and the line 8, the control pressure in the clutch 2 decreases only gradually because of the fixed orifice restriction 17 and the pressure reservoir 22 which provides a constant supply of the hydraulic medium until it has discharged. When downshifting is required at higher vehicle speeds the third-gear clutch 2 must be released early enough to allow sufficient time for the engine to accelerate and synchronize with the second-gear speed. The required pressure in the line 19 for progressively decreasing vehicle speeds is displayed by curves $P_{19}$, $P_{19}'$, $P_{19}''$ and $P_{19}'''$ shown in FIG. 1. The correct pressure cutoff in line 19 is obtained by means of the control valve 30, acting in conjunction with the pressure reservoir 22 and the fixed orifice restriction 17. The third-gear clutch 2 is kept momentarily engaged by the pressure reservoir 22 which discharges slowly through the fixed orifice restriction 17. When the pressure on the surface 36 of the sleeve valve 30 drops to the point that it is not sufficient to counter the pressure proportional to vehicle speed in the line 33 and the force of the spring 34, the piston 31 is displaced to the right-hand position. The fixed orifice restriction 17 then is bypassed, the pressure in the line 19, 19a drops to atmospheric pressure, and the third-gear clutch 2 disengages. The engine accelerates after the third-gear clutch 2 is disengaged to speed $n_2$, $n_2'$, $n_2''$ or $n_2'''$ as shown in FIG. 2, or to any other speed necessary for synchronism.

The time required for this acceleration is precisely the time allotted. The magnitude of the pressure in the line 33, being proportional to the vehicle speed, determines when the control valve 30 will be shifted, thereby determining when the fixed orifice restriction 17 will be bypassed, when the third gear clutch 2 will be disengaged, and how much time the unloaded engine will have to accelerate before the second-gear brake-band is applied.

The pressure reservoir 22 is filled by the control pressure in the clutch line 19 and the spring 25 acting against the piston 24, which in turn acts against the constantly-applied pressure in the line 26. Filling of the pressure reservoir 22 is accomplished during the upshift to third gear by means of the line 8, the check valve 18, bypassing the fixed orifice restriction 17, and the line system 19 and 19b. During this operation the piston 24 moves upward and the control valve 30 shifts to the left position illustrated in FIG. 3 because of the pressure increase on the surface 36 of the piston 31.

Many other embodiments of the invention will readily occur to those skilled in the art upon consideration of this disclosure. Accordingly, the invention is to be construed as including all apparatus that falls within the scope of the appended claims.

I claim:

1. An automatic transmission powered by an engine, for vehicles comprising means for initiating a downshift from a higher gear to a lower gear at time $t_1$, means for engaging the lower gear at time $t_2$ to complete the downshift, and means responsive to vehicle speed for unloading the engine by releasing the higher gear at a continuously variable release time between $t_1$ and $t_2$, the interval between the release time and time $t_2$ being just sufficient to allow the unloaded engine to accelerate into synchronism with the lower gear, regardless of vehicle speed when the downshift is made.

2. An apparatus for controlling the automatic shifting of a planetary gear when downshifting the type of automatic transmission used in motor vehicles having a clutch controlling the higher gear, a brake-band controlling the lower gear, the brake-band being actuated by a brake-band piston which is double-acting and receives control pressure from a hydraulic medium on the application side through a brake application line by means of a pressure-reducing device causing a pressure reduction in the hydraulic medium, and a sleeve valve that shifts in response to certain conditions of vehicle speed and engine load to connect to atmospheric pressure (1) a clutch line used to carry control pressure to the application side of the clutch piston and (2) a brake release line used to carry control pressure to the release side of the brake-band piston, the improvement comprising means defining a fixed orifice restriction in the clutch line, an unrestricted bypass line that is vented to atmospheric pressure and connected in parallel to the fixed orifice restriction means, the bypass line having opening means having continuously variable dependence on vehicle speed, a pressure reservoir means connected in parallel to the clutch to cause a delay in the drop of the control pressure in the clutch line by discharging, initially through the fixed orifice restriction and subsequently through the bypass line, and a single fixed orifice restriction means acting as the pressure reducing device associated with the application side of the brake band piston to cause engagement of the lower gear in a fixed time, the drop in control pressure in the clutch line and the disengagement of the higher gear being made dependent on vehicle speed by the pressure reservoir means, the bypass line opening means and the clutch line fixed orifice restriction means to allow sufficient time for engine synchronism with the lower gear and to permit a smooth downshift at any vehicle speed.

3. Apparatus according to claim 2, wherein the bypass line opening means comprises a control sleeve valve slidable between a first position in which it closes the bypass line opening means and a second position in which it opens the opening means.

4. Apparatus according to claim 3, wherein the control sleeve valve includes a double-ended piston having between its ends a recess of a length sufficient to bridge the bypass line inlet to and discharge from the control sleeve valve.

5. Apparatus according to claim 3, wherein the control sleeve valve includes a double-ended piston having a first end, a spring and a control pressure proportional to the vehicle speed acting upon the first end, and a second end, the second end closing the bypass line and being acted upon by the hydraulic medium discharged from the pressure reservoir, the pressure reservoir simultaneously discharging through the fixed orifice restriction in the clutch line.

6. The device according to claim 5, wherein the control sleeve valve piston has a recess located between its ends and being of a length sufficient to bridge the bypass line inlet to and discharge from the control sleeve valve.

7. The device according to claim 2, wherein the pressure reservoir means comprises a cylinder having a double-acting floating piston having a first side receiving a hydraulic pressure at all times during operation of the automatic transmission and a second side, and a spring and the control pressure in the clutch line acting in opposition to the hydraulic pressure on the first side.

8. The device according to claim 2, wherein the clutch includes a spring acting to release the clutch after the loss of control pressure in the clutch line.

* * * * *